US012771259B2

(12) United States Patent
Kasper et al.

(10) Patent No.: US 12,771,259 B2
(45) Date of Patent: Oct. 20, 2026

(54) HYBRID SWITCHED CAPACITOR POWER CONVERTER WITH RECTIFICATION

(71) Applicant: Infineon Technologies Austria AG, Villach (AT)

(72) Inventors: Matthias J. Kasper, Villach (AT); Roberto Rizzolatti, Villach (AT); Martin Wattenberg, Villach (AT)

(73) Assignee: Infineon Technologies Austria AG, Villach (AT)

( * ) Notice: Subject to any disclaimer, the term of this patent is extended or adjusted under 35 U.S.C. 154(b) by 207 days.

(21) Appl. No.: 18/668,359

(22) Filed: May 20, 2024

(65) Prior Publication Data

US 2025/0357868 A1 Nov. 20, 2025

(51) Int. Cl.
*H02M 3/335* (2006.01)
*H02M 1/00* (2007.01)

(52) U.S. Cl.
CPC ..... *H02M 3/33592* (2013.01); *H02M 1/0058* (2021.05); *H02M 3/33573* (2021.05)

(58) Field of Classification Search
CPC ......... H02M 3/33592; H02M 3/33573; H02M 1/0058
See application file for complete search history.

(56) References Cited

U.S. PATENT DOCUMENTS

| | | | | |
|---|---|---|---|---|
| 11,011,980 | B2 * | 5/2021 | Rizzolatti | H01F 29/025 |
| 11,362,576 | B1 * | 6/2022 | Rizzolatti | H02M 3/07 |
| 2020/0343040 | A1 * | 10/2020 | Rizzolatti | H01F 30/02 |
| 2020/0358352 | A1 * | 11/2020 | Rizzolatti | H02M 3/33573 |
| 2021/0006174 | A1 * | 1/2021 | Rainer | H02M 3/33507 |
| 2021/0288576 | A1 * | 9/2021 | Rizzolatti | H02M 1/007 |
| 2022/0263410 | A1 * | 8/2022 | Saggini | H02M 3/07 |
| 2023/0353058 | A1 * | 11/2023 | Rizzolatti | H02M 3/155 |
| 2024/0223089 | A1 * | 7/2024 | Ursino | H01F 27/2804 |
| 2025/0202353 | A1 * | 6/2025 | Rizzolatti | H02M 1/0064 |
| 2025/0350185 | A1 * | 11/2025 | Rizzolatti | H02M 1/0095 |

* cited by examiner

*Primary Examiner* — Sisay G Tiku
(74) *Attorney, Agent, or Firm* — Armis IP Law, LLC

(57) ABSTRACT

A power converter includes: a first circuit path including a first transformer winding connected in series with a first capacitor between a first node of the first circuit path and a second node of the first circuit path, the second node of the first circuit path is connected to an output node of the power converter; a second circuit path including a second transformer winding connected in series with a second capacitor between a first node of the second circuit path and a second node of the second circuit path, the second node of the second circuit path is connected to the output node of the power converter. First switch circuitry controls connectivity of the first node of the first circuit path to the second node of the first circuit path. Second switch circuitry controls connectivity of the first node of the second circuit path to the second node of the second circuit path.

25 Claims, 11 Drawing Sheets

HYBRID SWITCHED CAPACITOR POWER CONVERTER WITH RECTIFICATION

BACKGROUND

Data centers such as operated by Google™, Facebook™, and others provide indispensable services for our society. The energy consumption for all data centers worldwide is around 2% of overall electric energy usage. Therefore, datacenter providers are constantly looking to improve the efficiency of power conversion in order to save energy or to be able to increase the CPU/GPU/ASIC, etc., power of servers in existing data centers. Machine learning and artificial intelligent architectures require very powerful GPUs or custom designed ASICs to meet the required calculation power.

Traditionally, data center equipment operates with a 48 VDC input voltage, or alternatively, with a variable input voltage ranging from 40 VDC to 60 VDC, rather than the common 12 VDC bus. This preference for higher DC voltages offers several advantages, including reduced distribution losses within the server rack and motherboard. Various conventional methods are employed to deliver higher power per rack and per board, often involving the conversion of the input voltage into one or more output voltages.

Conventional Zero Voltage Switching Switched Capacitor (ZSC) converters may be based on the Dickson charge pump. In such an instance, a ratio of the input voltage to the output voltage may be given by the number of switched capacitors cells employed in the circuit. Such a converter offers high performance for 2:1 and 4:1 operation, due to resonant operation and soft switching operation, however such converter is a preferable solution when a "down-solution" is required. Such conventional converters are controlling the increase of power with the use of lower on-resistance power switches, however at PCB level the current density will follow the current path forced by the field effect transistor position and won't spread as in a transformer-based solution.

Another type of conventional power converter is based on implementation of higher step-down ratios where a transformer-based solution is preferable, as it provides an easy way to increase the transfer ratio by adjusting the transformer turn ratio. A so-called DCX (DC-Transformer) power converter is essentially an LLC converter operated with a fixed switching frequency at the resonance frequency. At this operating point the gain-factor of the resonant tanks is equal to 1.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator.

Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

This disclosure further includes the observation that power conversion efficiency and/or density of conventional power supplies can be improved. For example, to this end, this disclosure includes novel ways of providing improved performance and density (such as smaller circuits providing more power) of power conversion via generation of current in different legs of a respective power converter.

More specifically, this disclosure includes an apparatus (such as power converter, power converter stage, etc.) comprising: a first circuit path including a first transformer winding connected in series with a first capacitor between a first node of the first circuit path and a second node of the first circuit path, the second node of the first circuit path connected to an output node of the power converter; a second circuit path including a second transformer winding connected in series with a second capacitor between a first node of the second circuit path and a second node of the second circuit path, the second node of the second circuit path connected to the output node of the power converter; first switch circuitry operative to control connectivity of the first node of the first circuit path to the second node of the first circuit path; and second switch circuitry operative to control connectivity of the first node of the second circuit path to the second node of the second circuit path.

In accordance with further examples, the power converter as discussed herein can be configured to include a controller. The controller is operative to control the first switch circuitry and the second switch circuitry in accordance with a first mode and a second mode.

The first mode may include activation of the second switch circuitry to an ON-state and deactivation of the first switch circuitry to an OFF-state. The second mode may include activation of the first switch circuitry to an ON-state and deactivation of the second switch circuitry to an OFF-state.

Note further that a magnitude of an output current outputted from the output node of the power converter is substantially equal to a magnitude of first current through the first circuit path during the first mode; a magnitude of the output current outputted from the output node of the power converter is substantially equal to a magnitude of second current through the second circuit path during the second mode.

In accordance with still further examples, the power converter as discussed herein can be configured to include third switch circuitry disposed in series with the first switch circuitry between an input voltage source and the output node. The third switch circuitry may be directly coupled between the input voltage source and the first node of the first circuit path. Additionally, the power converter as discussed herein can be configured to include fourth switch circuitry disposed in series with the second switch circuitry between the output node and a reference voltage. The fourth switch circuitry may be directly coupled between the first node of the second circuit path and a reference voltage node.

Yet further, the power converter as discussed herein can be configured to include a controller operative to control the first switch circuitry, the second switch circuitry, the third switch circuitry, and the fourth switch circuitry in accordance with a first mode and a second mode. The first mode may include activation of the third switch circuitry and the first switch circuitry to ON-states and deactivation of the fourth switch circuitry and the second switch circuitry to OFF-states; the second mode may include deactivation of the third switch circuitry and the first switch circuitry to OFF-states and activation of the fourth switch circuitry and the second switch circuitry to ON-states.

Yet further, as discussed herein, operation in the first mode charges the first capacitor and the second capacitor; operation in the second mode discharges the first capacitor and the second capacitor.

In yet further examples as discussed during, the power converter can be configured to include a series connection of multiple switches between an input voltage source and a reference voltage node. The series connection may include the first switch circuitry and the second switch circuitry.

Still further, note that the first switch circuitry and the second switch circuitry may be activated in accordance with zero voltage switching.

In further examples, the power converter includes an autotransformer. The autotransformer can be configured to include the first transformer winding and the second transformer winding disposed in series.

In another example, switching operation of the first switch circuitry and the second switch circuitry may be configured to provide full bridge rectification of first current through the first capacitor and second current through the second capacitor to produce a corresponding output current outputted from the output node.

Still further examples as discussed herein include a method comprising: controlling connectivity of a first node of a first circuit path to a second node of the first circuit path, the first circuit path including a first transformer winding connected in series with a first capacitor between the first node of the first circuit path and the second node of the first circuit path; controlling connectivity of a first node of a second circuit path to a second node of the second circuit path, the second circuit path including a second transformer winding connected in series with a second capacitor between the first node of the second circuit path and the second node of the second circuit path; and outputting first current received from the first circuit path and second current received from the second circuit path from an output node of a power converter.

As further discussed herein, the method may include the controller controlling the first switch circuitry and the second switch circuitry in accordance with a first mode and a second mode, the first mode including activation of the second switch circuitry to an ON-state and deactivation of the first switch circuitry to an OFF-state, the second mode including activation of the first switch circuitry to an ON-state and deactivation of the second switch circuitry to an OFF-state.

Additionally, the methods as discussed herein may include the controller: i) controlling operation of third switch circuitry disposed in series with the first switch circuitry between an input voltage source and the output node, the third switch circuitry directly coupled between the input voltage source and the first node of the first circuit path; ii) controlling operation of fourth switch circuitry disposed in series with the second switch circuitry between the output node and a reference voltage, the fourth switch circuitry directly coupled between the first node of the second circuit path and a reference voltage node.

Yet further examples of methods herein include the controller: controlling the first switch circuitry, the second switch circuitry, the third switch circuitry, and the fourth switch circuitry in accordance with a first mode and a second mode; in the first mode, activating the third switch circuitry and the first switch circuitry to ON-states and deactivating the fourth switch circuitry and the second switch circuitry to OFF-states; and in the second mode, deactivating the third switch circuitry and the first switch circuitry to OFF-states and activating the fourth switch circuitry and the second switch circuitry to ON-states.

Note that any of the resources such as controller or other entity as discussed herein can include one or more computerized devices, apparatus, hardware, etc., execute and/or support any or all of the method operations disclosed herein. In other words, one or more computerized devices or processors can be programmed and/or configured to operate as explained herein to carry out the different techniques as described herein.

Other aspects of the present disclosure include software programs and/or respective hardware to perform any of the operations summarized above and disclosed in detail below.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of techniques herein (BRIEF DESCRIPTION) purposefully does not specify every novel aspect of the present disclosure or claimed invention(s). Instead, this brief description only presents general aspects and corresponding points of novelty over conventional techniques. For additional details and/or possible perspectives (permutations) of the invention(s), the reader is directed to the Detailed Description section (which is a summary) and corresponding figures of the present disclosure as further discussed below.

Figure 1:
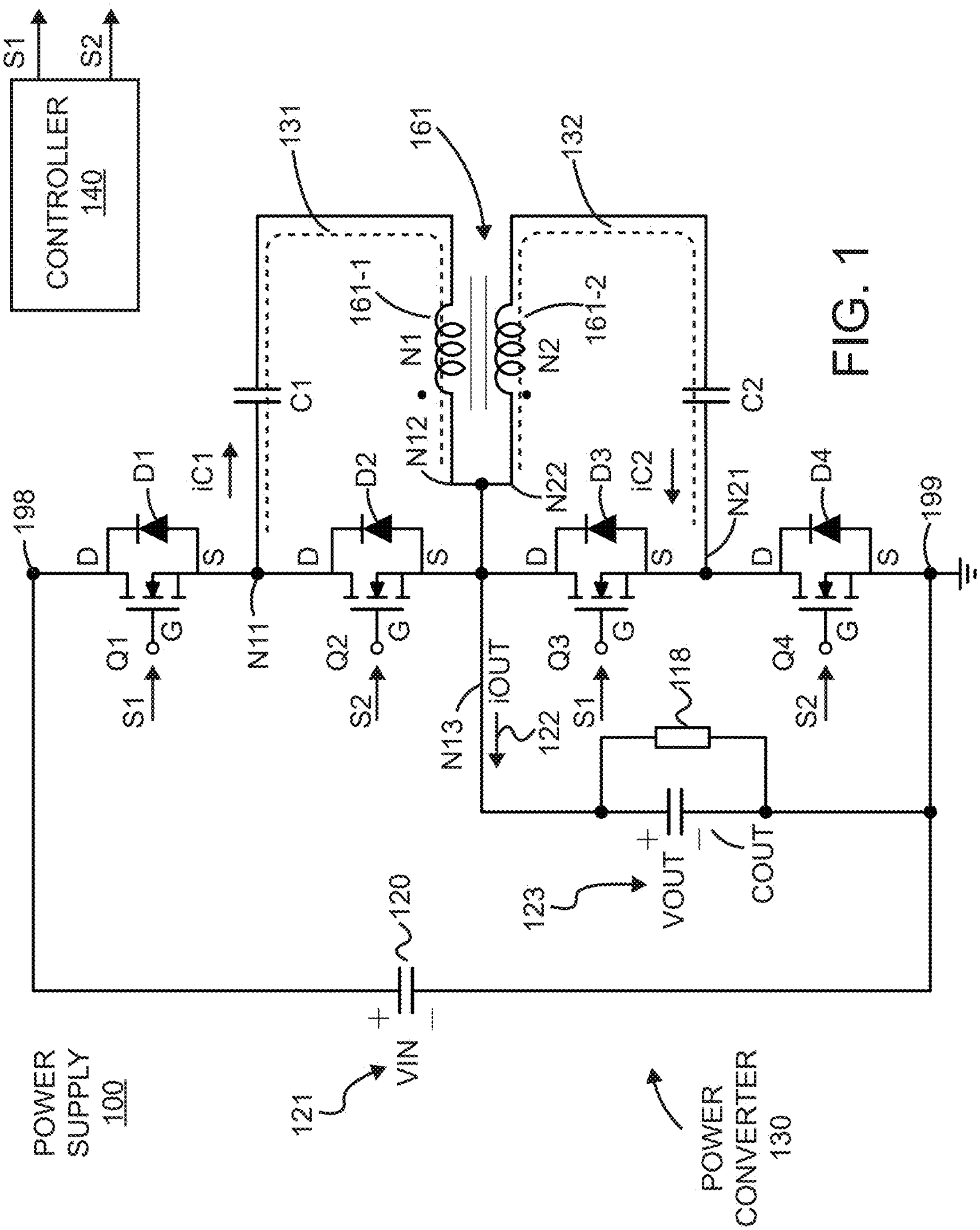
FIG. 1 is an example diagram illustrating a hybrid switched capacitor power converter as discussed herein.

The foregoing and other objects, features, and advantages of the disclosed matter herein will be apparent from the following more particular description herein, as illustrated in the accompanying drawings in which like reference characters refer to the same parts throughout the different views. The drawings are not necessarily to scale, with emphasis instead being placed upon illustrating the principles, concepts, aspects, techniques, etc.

DETAILED DESCRIPTION

As previously discussed, the different configurations of power converters as presented in this disclosure are useful over conventional techniques. For example, in contrast to conventional techniques, the novel power supply as described herein provides benefits over conventional switched capacitor converter techniques such as reduced voltage rating of the semiconductor devices (such as switches), simple control/driving scheme, benefit of decoupling of magnetic flux from the load current resulting in reduced or no saturation at over-load, load independent soft-switching, fixed conversion ratio adjustable with transformer turns ratio, and so on.

In general, an implementation of the circuitry as described herein may include an auto-transformer assembly as a magnetic element. As further discussed herein, the leakage inductance of the auto-transformer may be used as resonance inductance to form a resonant tank circuit including a resonant capacitor. Moreover, the magnetizing current from the auto-transformer of the power converter supports load-independent soft-switching (ZVS or Zero Voltage Switching) of the switches.

Now, more specifically, FIG. 1 is an example diagram illustrating a hybrid switched capacitor power converter as discussed herein.

As shown in FIG. 1, power supply 100 includes a controller 140 and power converter 130 to produce an output voltage 123 (a.k.a., Vout, voltage across capacitor Cout) and corresponding output current 122 (a.k.a., iout) to power a load 118.

The power converter 130 can be configured to include any suitable circuitry to support conversion of the input voltage 121 (a.k.a., Vin, voltage across input voltage source 120) into the output voltage 123.

For example, as shown in FIG. 1, the power converter 130 can be configured to include multiple switches (such as field effect transistors or other suitable switch components) such as switch Q1, switch Q2, switch Q3, and switch Q4.

In this example, the combination of switches Q1, Q2, Q3, and Q4 are connected in series between the input voltage node 198 receiving the input voltage 121 (from power source 120) and the reference node 199 connected to a ground reference voltage of the power source 120.

More specifically, the drain node D of the switch Q1 is directly connected to the node 198; the source node S of the switch Q1 and the drain node D of the switch Q2 are directly connected to the node N11; the source node S of the switch Q2 and the drain node D of the switch Q3 are directly connected the node N13 (same as node N12 and N22); the source node S of the switch Q3 and the drain node D of the switch Q4 are directly connected to the node N21; and the source node S of the switch Q4 is directly connected to the reference voltage node 199.

As further shown, the switch Q1 includes the inherent (a.k.a., body) diode D1; the switch Q2 includes the inherent diode D2; the switch Q3 includes the inherent diode D3; and the switch Q4 includes the inherent diode D4.

Additionally, the power converter 130 as discussed herein includes capacitor C1, capacitor C2, and a respective transformer assembly 161 such as an autotransformer or other suitable entity.

Transformer assembly 161 includes transformer winding 161-1 and transformer winding 161-2. The transformer winding 161-1 and the transformer winding 161-2 are inductively or magnetically coupled to each other in the transformer 161.

Each of the windings in the transformer 161 can include any number of turns. For example, the transformer winding 161-1 can be configured to include N1 turns while the transformer winding 161-2 can be configured to include N2 turns.

The value N1 may equal the value N2. The number of turns N1 associated with winding 161-1 may be different than the number of turns N2 in the transformer winding 161-2.

In general, as previously discussed, the power converter 130 in this example receives the input voltage 121 supplied by the power source 120. The controller 140 produces respective control signals such as signal S1 and signal S2 to control the respective switches Q1, Q2, Q3, and Q4 in the power converter 130 to convert the input voltage 121 into the corresponding output voltage 123.

As shown, the control signal S1 controls operation of switch Q1 and switch Q3. The control signal S2 controls operation of switch Q2 and Q4.

Note that each of these components represents an entity such as an apparatus, electronic device, electronic circuitry, etc. Note further that each of the resources as described herein can be instantiated in any suitable manner. For example, the controller 140 can be instantiated as or include hardware (such as circuitry), software (executable instructions), or a combination of hardware and software resources where applicable.

In one example, the power converter 130 includes a first circuit path 131 and a second circuit path 132.

The first circuit path 131 includes a series combination of the capacitor C1 and the transformer winding 161-1 disposed between the node N11 and the node N12.

The second circuit path 132 includes a series combination of the capacitor C2 and the transformer winding 161-2 disposed between the node N21 and the node N22.

In one example, node N12 and node N22 (also known as node N13) is a single node and represents a common tap node (such as a center tap node) of the transformer 161.

The controller 140 produces the control signal S2 to control connectivity of a first node N11 of the first circuit path 131 to a second node N12 of the first circuit path 131. For example, setting the signal S2 to a logic high activates the respective switch Q2 to an ON-state providing a low impedance path between the node N11 and the node N12. It is further noted that setting the control signal S2 to a logic low deactivates the respective switch Q2 to an OFF-state resulting in a high impedance path between the drain node and the source node of the switch Q2.

The control signal S2 also controls the connectivity of the node N21 to the reference node 199.

For example, when the control signal is a logic high, the switch Q4 is activated to an ON-state connecting the node N21 to the node 199 via a low impedance circuit path. Conversely, when the control signal S2 is a logic low, the switch Q4 is deactivated to an OFF-state providing a high impedance path between the node N21 and the node 199.

The controller 140 further produces the control signal S1 to control connectivity of a first node N21 of the second circuit path 132 to a second node N22 of the second circuit path 132.

For example, setting the control signal S1 to a logic high activates the respective switch Q3 to an ON-state providing a low impedance path between the node N21 and the node N22. It is further noted that setting the control signal S1 to a logic low deactivates the switch Q3 to an OFF-state providing a high impedance path between the drain node and the source node of the switch Q3.

The control signal S1 also controls the connectivity of the node N11 to the node 198. For example, when the control signal S1 is a logic high, the switch Q1 is activated to an on state connecting the node N11 to the node 198 via a low impedance circuit path. Conversely, when the control signal S1 is a logic low, the switch Q1 is deactivated to an OFF-state providing a high impedance path between the node 198 in the node N11.

As further discussed herein, switching of the switches in the power converter 130 results in generation of first current iC1 received from the first circuit path 131 and second current iC2 received from the second circuit path 132. The combination of the first current iC1 and the second current iC2 is outputted from an output node N13 of the power converter 130 to produce the output voltage 123 supplied to power the load 118.

Thus, the proposed power converter 130 such as a hybrid switched capacitor structure with quasi-FB rectification (HSC-QFB) can be configured to multiple switches: where a first group of switches includes switches Q1 and Q3 controlled by control signal S1 and where a second group of switches includes switches Q2 and Q4 controlled by control signal S2. The driving control signals S1 and S2 as produced by the controller 140 may be 180° phase shifted PWM signals with respect to each other, and potentially having the same duty cycle.

Yet further, note that the power converter 130 can be configured to operate at any duty cycle such as including operating at a fixed duty cycle of approximately 50 percent to achieve a minimum RMS (Root Mean Square) current on the output current 122.

In one example, a magnitude of the output voltage 123 as produced by the power converter 130 depends on the number of turns (N1, N2) associated with the transformer windings in the transformer 161.

For example, as previously discussed, the transformer winding 161-1 includes N1 turns while the transformer winding 161-2 includes N2 turns. Thus the ratio of windings in the transformer 161 (such as an auto-transformer) is ratio (N1/N2). The ratio between input voltage Vin (121) and output voltage Vout (123) is given by the following equation:

$$\mathrm{Vin}/\mathrm{Vout} = 1+N1/N2 = (N2+N1)/N2 \quad \text{Equation 1}$$

Still further, note that the proposed power converter 130 (such as an HSC-QFB power converter) as discussed herein is scalable itself to different conversion ratios by designing only the ratio between N1 and N2, providing a new family of unregulated hybrid dc-dc converter with different ratios such as, for example, 2 to 1, 4 to 1, 5 to 1, 6 to 1, etc.

Figure 2:
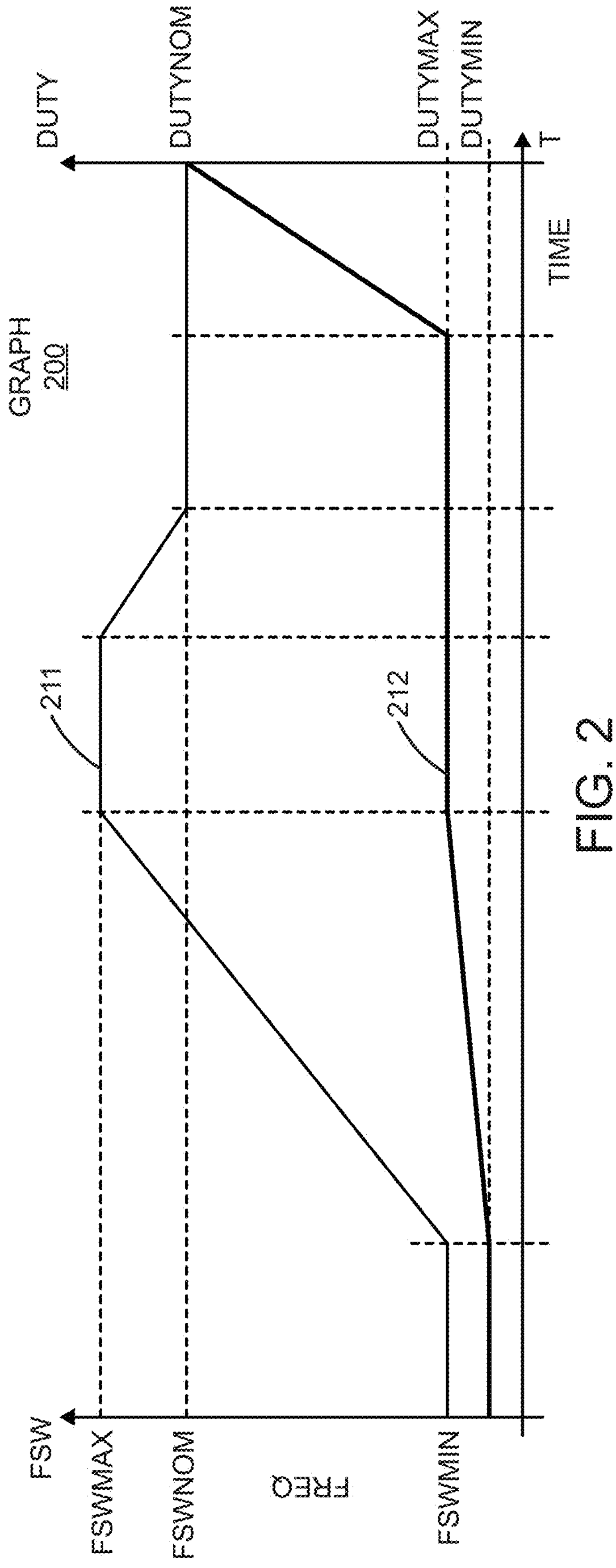
FIG. 2 is an example graph illustrating control of a switching frequency and duty cycle of control signals supplied to the corresponding switches of the hybrid switched capacitor power converter during startup as discussed herein.

FIG. 2 is an example graph illustrating control of a switching frequency applied to the hybrid switched capacitor power converter during startup (startup procedure) as discussed herein.

Graph 200 is a timing diagram illustrating a proposal of controlling a respective switching frequency (211) and/or duty cycle (212) of the corresponding switches Q1-Q4 in the power converter 130 during startup.

In this example, when an input voltage 121 is first applied to the input node 198 of the power converter 130, the entire system (power converter 130) is charged and the value of the actual input inrush current (i.e. due to short circuit operation at startup) from the voltage source 120 to the node 198 depends on the impedance of the power converter 130 which presents mainly a capacitive behavior.

The magnitude of the input inrush current from the input voltage source 120 to the node 198 can exceed the current capability of the components, resulting in damage to the power converter 130. This problem can be solved by reducing the voltage rise time on the input voltage 121 of the power converter 130 during start-up operation of the power converter ramping up from 0 volts to a target voltage. To achieve this, one of multiple different solutions may be adopted: voltage regulation at the input (with a buck converter) or with a load switch (i.e. FET place at the input operating in linear mode to limit inrush current).

The two solutions mentioned can help to manage inrush current issue, however all of these factors affect the overall BOM (Bill Of Material or cost of the power converter 130) and therefore potentially reduce power density.

Figure 3:
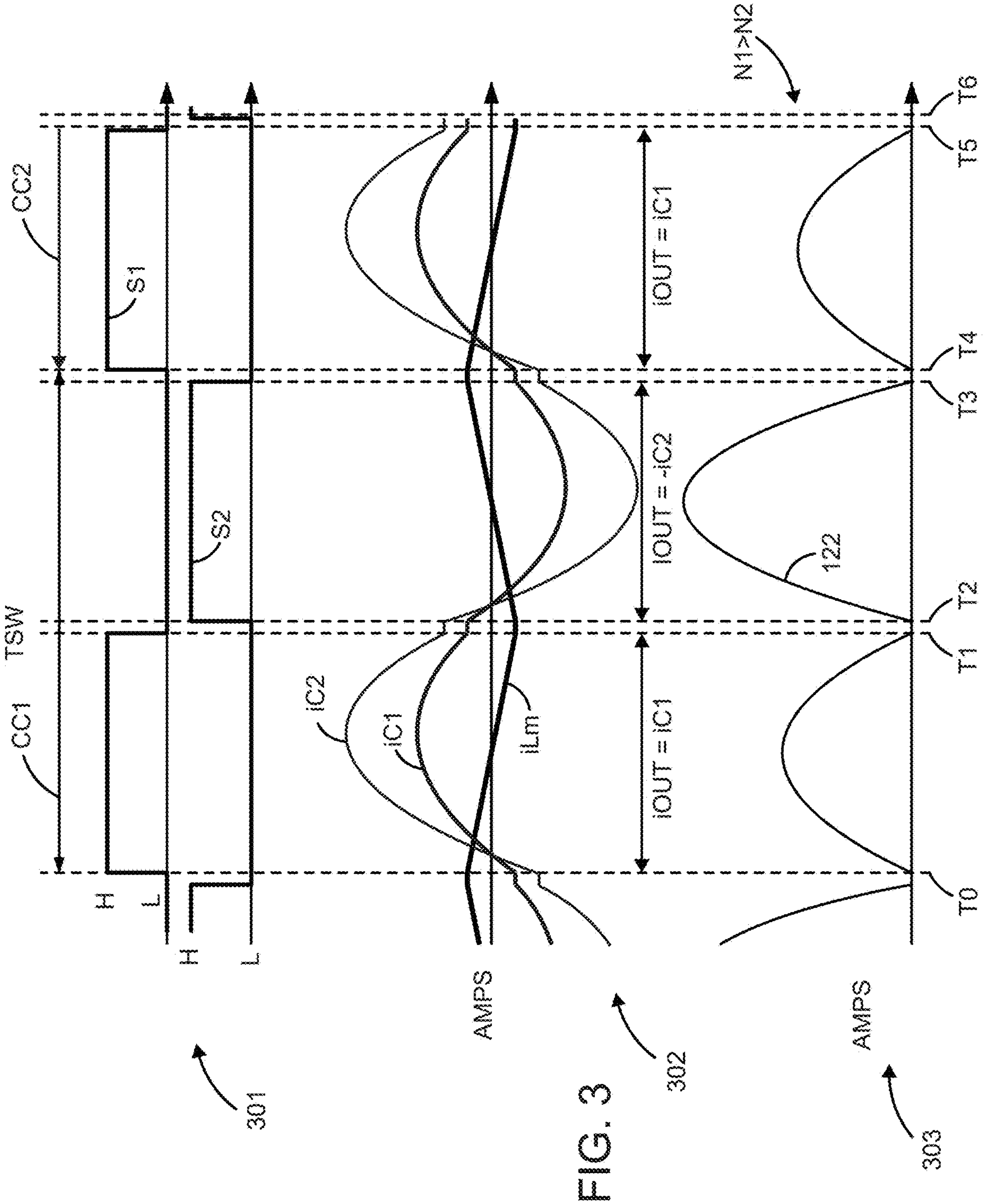
FIG. 3 is an example timing diagram illustrating switch settings and corresponding conversion of an input voltage into an output voltage to power a load as discussed herein.

FIG. 3 is an example timing diagram illustrating switch settings and corresponding conversion of an input voltage into an output voltage to power a load as discussed herein.

In this example, assume that the number of turns N1 associated with the transformer winding 161-1 is greater than the number of turns N2 associated with the transformer winding 161-2.

Timing diagram 301 in FIG. 3 is illustrates voltage levels associated with the control signals S1 and S2 over time.

For example, the first control cycle CC1 occurs between time T0 and time T4. Between a first portion of the first control cycle such as between time T0 and time T1, the controller 140 produces the respective control signal S1 to be a logic high; between time T1 and time T4, the controller 140 produces the respective control signal S1 to be a logic low; between time T4 and time T5, the controller 140 produces the respective control signal S1 to be a logic high; and so on.

Note that the controller 140 controls settings of the signal S1 in control cycle CC2 and other subsequent cycles to be similar to or the same as cycle CC1.

Additionally, in control cycle CC1, between time T0 and time T2, the controller 140 produces the respective control signal S2 to be a logic low; between time T2 and time T3, the controller 140 produces the respective control signal S2 to be a logic high; between time T3 and time T6, the controller 140 produces the respective control signal S2 to be a logic low; and so on.

The controller 140 controls settings of the signal S2 in control cycle CC2 and other subsequent control cycles to be similar to or the same as cycle CC1.

Yet further, the timing diagram 302 in FIG. 3 illustrates magnitudes of different currents in the power converter 130 over time.

The current iC1 represents a magnitude of the current supplied from the node N11 through the circuit path 131 and node N12 to the output node N13.

The current iC2 represents a magnitude of the current supplied from the node N21 through the circuit path 132 and node N22 to the output node N13.

Figure 4:
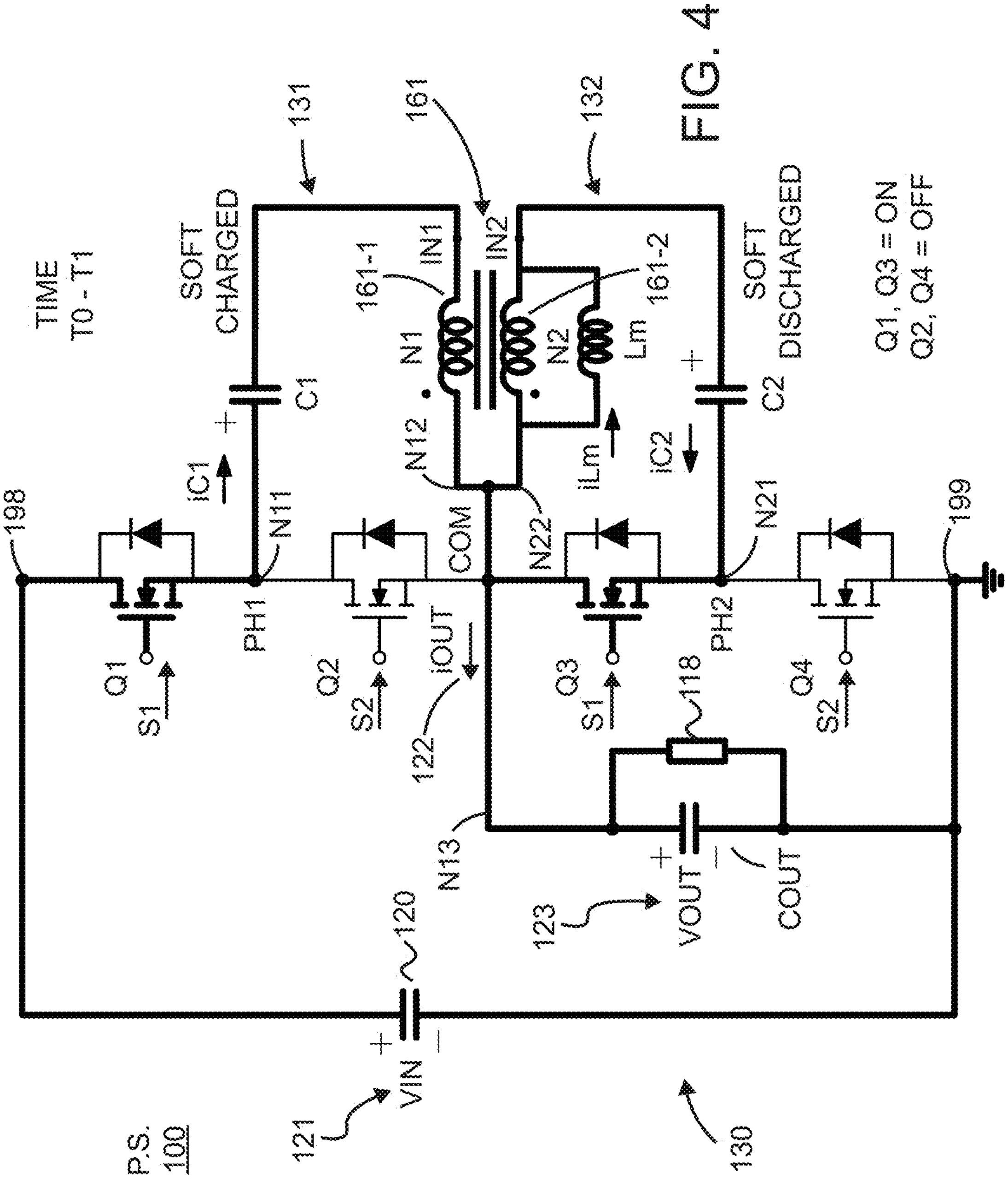
FIG. 4 is an example diagram illustrating operation of the hybrid switched capacitor power converter during a first mode as discussed herein.

The current iLm represents a magnitude of the magnetizing current associated with the inductance Lm of the transformer 161 (See FIG. 4).

Timing diagram 303 in FIG. 3 further illustrates a magnitude of the output current 122 (iout) supplied from the node N13 to the load 118. For example, the output current 122 (iout) between time T0 and time T1 is equal to current iC1; the output current 122 (iout) between time T2 and time T3 is equal to −iC2.

Between time T1 and time T2 and between time T3 and T4, such as during so-called dead time, the magnitude of the output current 122 is substantially zero.

FIG. 4 is an example diagram illustrating operation of the unregulated hybrid switched capacitor power converter with full bridge rectifier during a first mode as discussed herein.

In this example, between time T0 and T1 (such as a first mode), the controller 140 produces the respective control signal S1 to be a logic high level. As shown in FIG. 4, this causes the activation of switch Q1 and switch Q3 to an ON-state.

Further, between time T0 and time T1, the controller 140 produces the respective control signal S2 to be a logic low level, causing the deactivation of switch Q2 and Q4 to an OFF-state.

The equations below assume ideal switches, autotransformer, and capacitors.

Thus, between time T0 and time T1: at t=T0 switches Q1 and Q3 are turned on in ZVS (Zero Voltage Switching) and a resonant transition takes place between capacitor C1 and the leakage inductance Lr of the transformer 161 (such as autotransformer). The OFF-state of the switch Q2 results in a high impedance path between the node N11 and the node N12 through the switch Q2. The ON-state of switch Q3 results in a low impedance path between the node N21 and the node N22.

In such an instance, between time T0 and time T1, the first circuit path 131 is connected between the node 198 and the node N13. In such an instance, during the first mode between time T0 and time T1, capacitor C1 is soft-charged from the input voltage 121 supplied through the ON-state of the switch Q1 to the capacitor C1, while capacitor C2 is soft-discharged.

Further, during the mode between time T0 and time T1, the capacitor C2 and corresponding soft discharging demagnetizes the windings associated with transformer 161, where the DC voltage across the capacitor C2 is half the magnitude of the output voltage 123. This is desirable because the voltage faced by the transformer 161 is half of the output voltage 123.

As previously discussed, in this case, the number of turns N1 is greater than the number of turns N2. Based on the state of the power converter 130 in FIG. 4, the total output current 122 such as iout (122) is calculated as follows:

$$iout(t) = iC1(t), \text{ where } t = \text{time}, \quad \text{(equation 2)}$$

$$iC1(t) = iC2(t) * N2/N1. \quad \text{(equation 3)}$$

Figure 5:
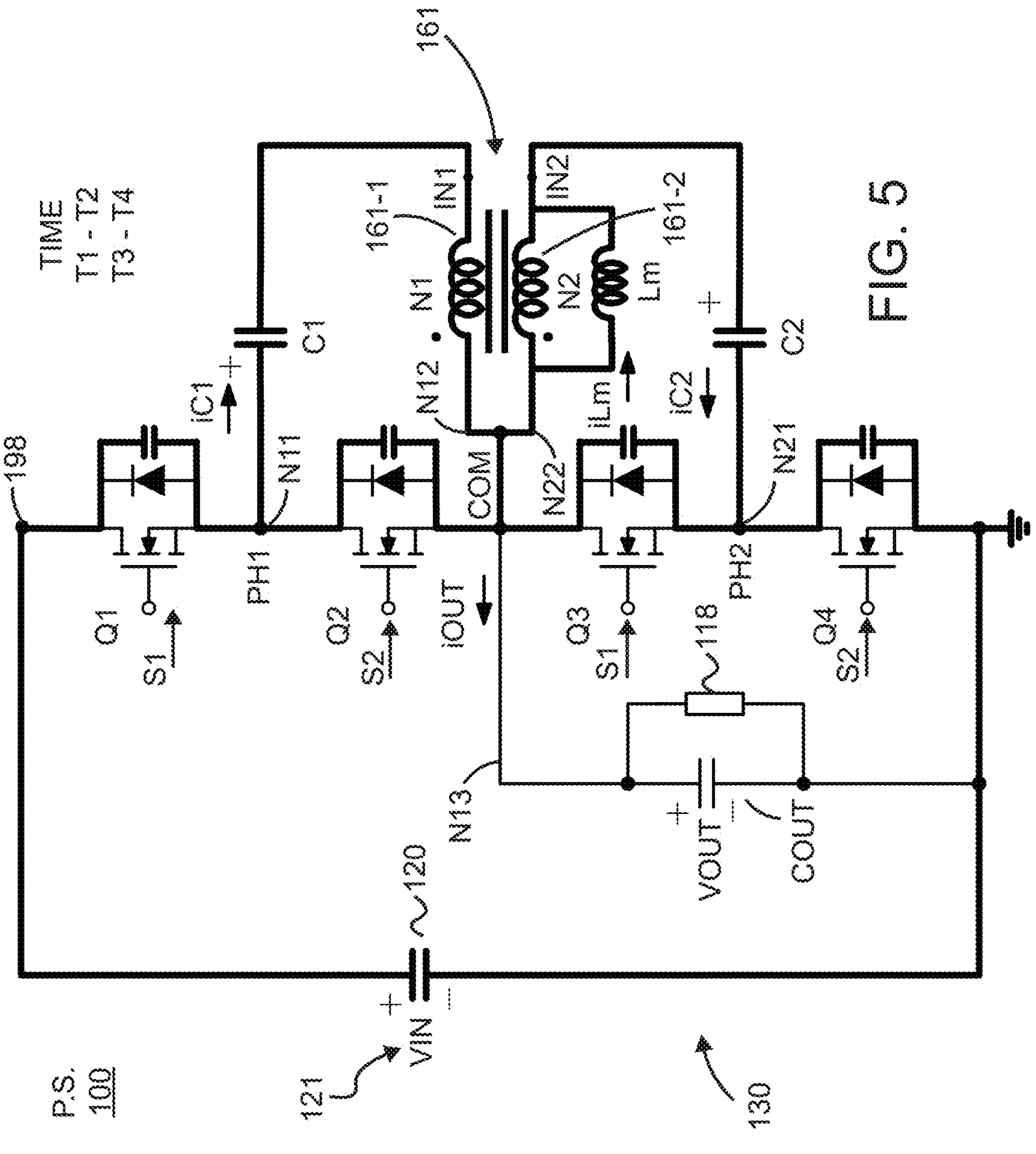
FIG. 5 is an example diagram illustrating operation of the hybrid switched capacitor power converter during a dead time mode as discussed herein.

FIG. 5 is an example diagram illustrating operation of the hybrid switched capacitor power converter during a second mode as discussed herein.

During the so-called dead time mode between time T1 and time T2 and between time T3 and T4, the controller 140 controls all of the switches Q1, Q2, Q3, and Q4 to an OFF-state. In such an instance, the parasitic output capacitances (respective capacitance between a source node and a drain node of the switch) of switches Q2 and Q4 are discharged to zero, using the inductive energy stored in the magnetizing inductance Lm at time T1. When the parasitic output capacitances of switches Q2 and Q4 are discharged to zero, their respective body diodes start to conduct to enable Zero Voltage Switching (ZVS) turn-on.

Note that the current iLm at time T1 that enables ZVS operation, is denoted as i(L(m,pk) is given by the following equation:

$$I(L(m, pk)) = Vout/(8 * Lm * fsw) \quad \text{(equation 4)}$$

Figure 6:
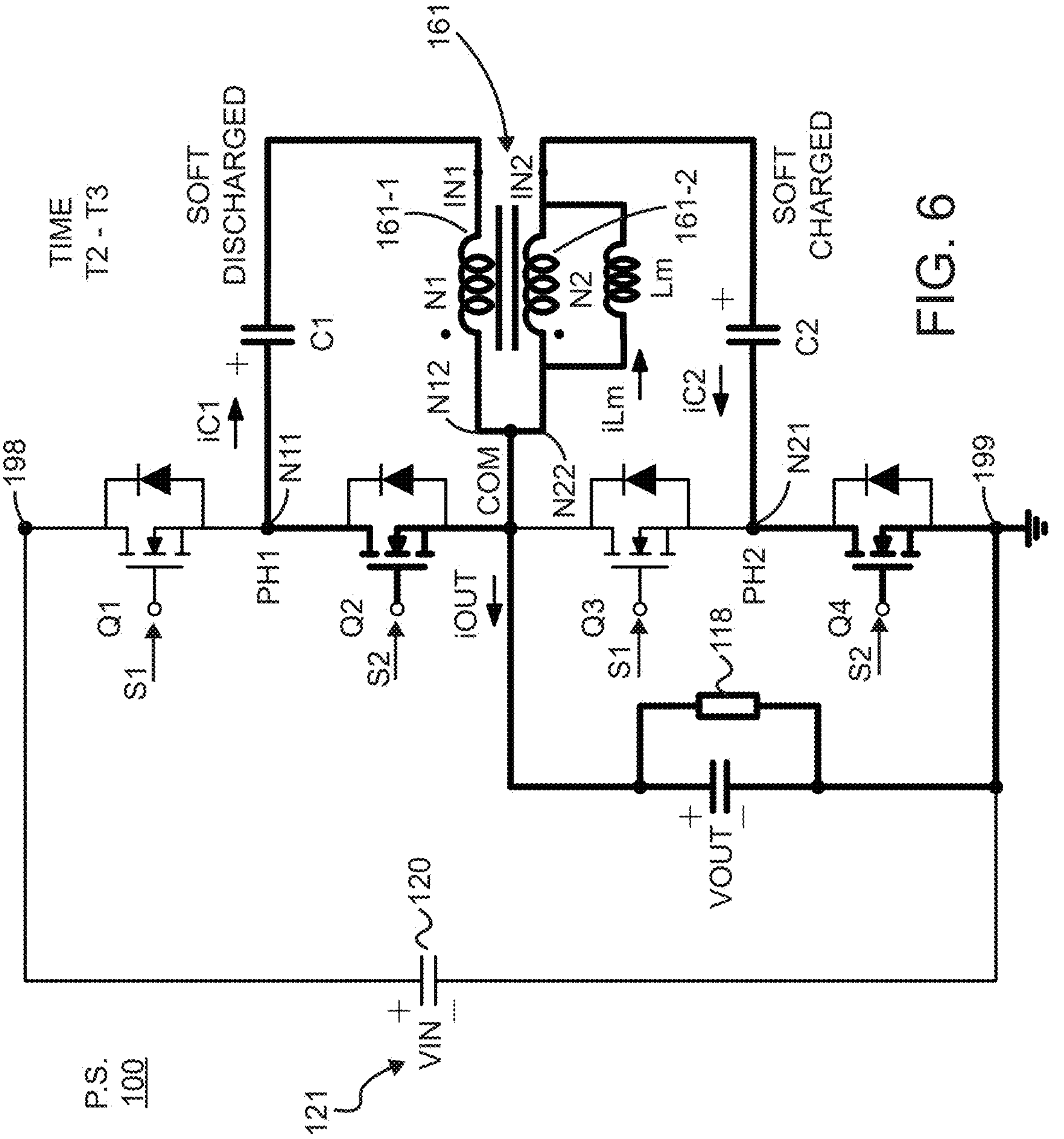
FIG. 6 is an example diagram illustrating operation of the hybrid switched capacitor power converter during a second mode as discussed herein.

FIG. 6 is an example diagram illustrating operation of the hybrid switched capacitor power converter during a second mode as discussed herein.

The second mode includes operation of the respective switches of the power converter 130 between time T2 and time T3.

Between time T2 and time T3 as shown in FIG. 6, the controller 140 produces the control signal S2 to activate switches Q2 and Q4 to an ON-state via zero voltage switching. In such an instance, a resonant transition takes place between capacitor C1 and the leakage inductance Lr of the transformer 161. During this mode between time T2 and time T3, the capacitor C1 is soft-discharged while capacitor C2 is soft-charged.

In this phase between time T2 and time T3, the transformer 161 is magnetized by half the magnitude of the input voltage 121.

Additionally, during this mode between time T2 and time T3, the voltage faced by the input winding (i.e. between IN1 and COM) is the voltage across the capacitor C1, therefore the DC voltage across capacitor C1 can be calculated with the following equation:

$$VC1 = (Vout * N1)/(2 * N2) \quad \text{(equation 5)}$$

Considering the power converter circuit depicted in FIG. 6, during the mode between time T2 and time T3, the total output current 122 can be calculated with the following equation:

$$iout(t) = -iC2(t) \quad \text{(equation 6)}$$

Thus, the controller 140 as discussed herein is operative to control the first switch circuitry (such as switch Q2) and the second switch circuitry (such as switch Q3) in accordance with a first mode (such as between time T0 and time T1) and a second mode (such as between time T2 and time T3), the first mode including activation of the second switch circuitry (Q3) to an ON-state and deactivation of the first switch circuitry (Q2) to an OFF-state, the second mode including activation of the first switch circuitry (Q2) to an ON-state and deactivation of the second switch circuitry (Q3) to an OFF-state.

A magnitude of the output current 122 (iOUT) outputted from the output node 113 of the power converter 130 is substantially equal to a magnitude of first current iC1 through the first circuit path 131 during the first mode (between time T0 and time T1). A magnitude of the output current 122 (such as iOUT=−iC2) outputted from the output node 113 of the power converter is substantially equal to a magnitude of second current through the second circuit path during the second mode (between time T2 and time T3).

Additionally, the controller 140 as discussed herein controls the switches Q1, Q2, Q3, and Q4 in accordance with multiple different modes. Operation in the first mode between time T0 and time T1 results in charging of the capacitor C1 and discharging of the capacitor C2. Operation in the second mode between time T2 to time T3 results in charging of the capacitor C2 and discharging of the capacitor C1.

Switching operation of the switch Q2 and the switch Q3 is configured to provide full bridge rectification of first current iC1 through the first capacitor C1 and second current iC2 through the second capacitor C2 to produce a corresponding rectified output current 122 outputted from the output node 113.

Figure 7:
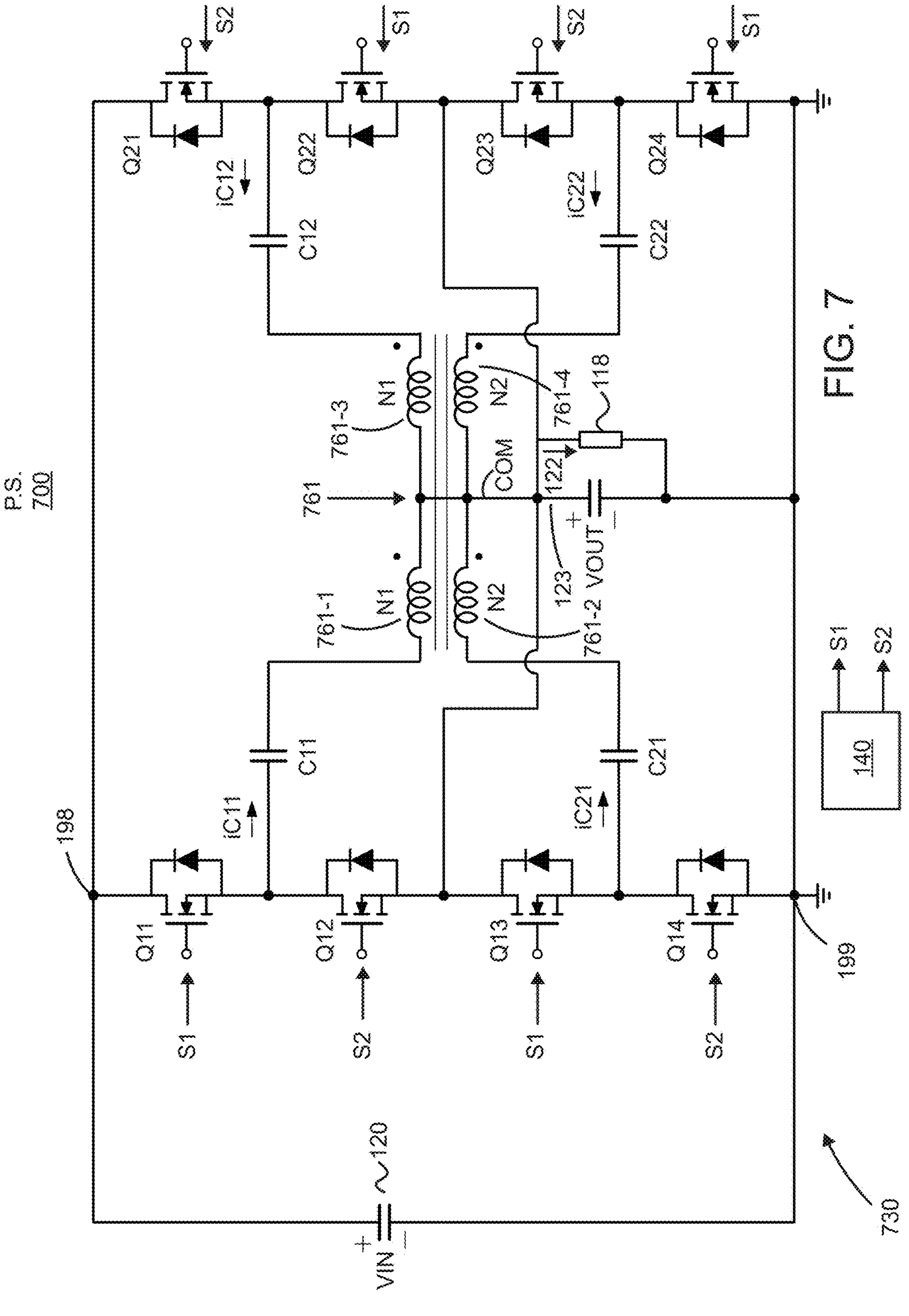
FIG. 7 is an example diagram illustrating a hybrid switched capacitor power converter as discussed herein.

FIG. 7 is an example diagram illustrating a hybrid switched capacitor power converter as discussed herein.

In this example, the power supply 700 is an alternative implementation of an unregulated Hybrid Switched capacitor converter providing quasi full bridge rectification.

For example, the power supply 700 includes a controller 140 and power converter 730 to produce an output voltage VOUT (123) and corresponding output current 122 (a.k.a., iout) to power a load 118.

The power converter 130 can be configured to include any suitable circuitry to support conversion of the input voltage 121 into the output voltage 123.

For example, as shown in FIG. 7, the power converter 730 can be configured to include a first set of switches (such as field effect transistors or other suitable switch components) such as switch Q11, switch Q12, switch Q13, and switch Q14 and a second set of switches (such as field effect transistors or other suitable switch components) such as switch Q21, switch Q22, switch Q23, and switch Q24.

In this example, the combination of switches Q11, Q12, Q13, and Q14 are connected in series between the input voltage node 198 receiving the input voltage 121 and the reference node 199 connected to ground reference voltage.

The combination of switches Q21, Q22, Q23, and Q24 are connected in series between the input voltage node 198 receiving the input voltage 121 and the reference node 199 connected to ground reference voltage.

Additionally, the power converter 130 includes capacitor C11, capacitor C12, capacitor C21, capacitor C22, and a respective transformer assembly 761.

Transformer assembly 761 includes winding 761-1, winding 761-2, winding 761-3, and winding 761-4. Each of the windings 761-1, 761-2, 761-3, and 761-4, are inductively or magnetically coupled to each other in the transformer 761.

Each of the windings in the transformer 761 can include any number of turns. For example, each of the transformer winding 761-1 and 761-3 can be configured to include N1 turns while the transformer winding 761-2 and 761-4 can be configured to include N2 windings. The value N1 may equal the value N2. The number of turns N1 may be different than the number of windings N2.

In one example, the transformer 761 is an autotransformer including a tap node COM. The tap node COM outputs the output voltage 123 and corresponding output current.

In general, the power converter 130 in this example receives the input voltage 121 supplied by the power source 120. In a similar manner as previously discussed, the controller 140 produces respective control signals such as control signal S1 and control signal S2 to control the respective switches in the power converter 730 to convert the input voltage 121 into the corresponding output voltage 123. Activation of the respective switches via the control signals S1 and S2 results in generation of the respective output voltage 123 in a similar manner as previously discussed. However, in this case, there is double the circuitry (such as parallel circuitry) to produce the output voltage 123 and corresponding output current 122.

Thus, the proposed converter as discussed herein is scalable itself to different configurations as alternative to the power converter 130. As an example, primitives of such a power supply are: input half-bridge (i.e., formed by switch Q1 and switch Q2) and the winding between IN1 and COM or output half-bridge (i.e., formed by switch Q3 and switch Q4) and the winding between IN2 and COM.

In one example, the power supply 700 in FIG. 7 is a Hybrid Switched capacitor converter with quasi FB (full bridge) rectification in dual-phase operation where all the windings are built within the same magnetic core. In such an instance, each of the windings 761-1, 761-2, 761-3, and 761-4 are magnetically (inductively) coupled to each other. Thus, in general, the power converter shown in FIG. 7 is a redundant version of the power converter 130 implemented in FIG. 4.

Figure 8:
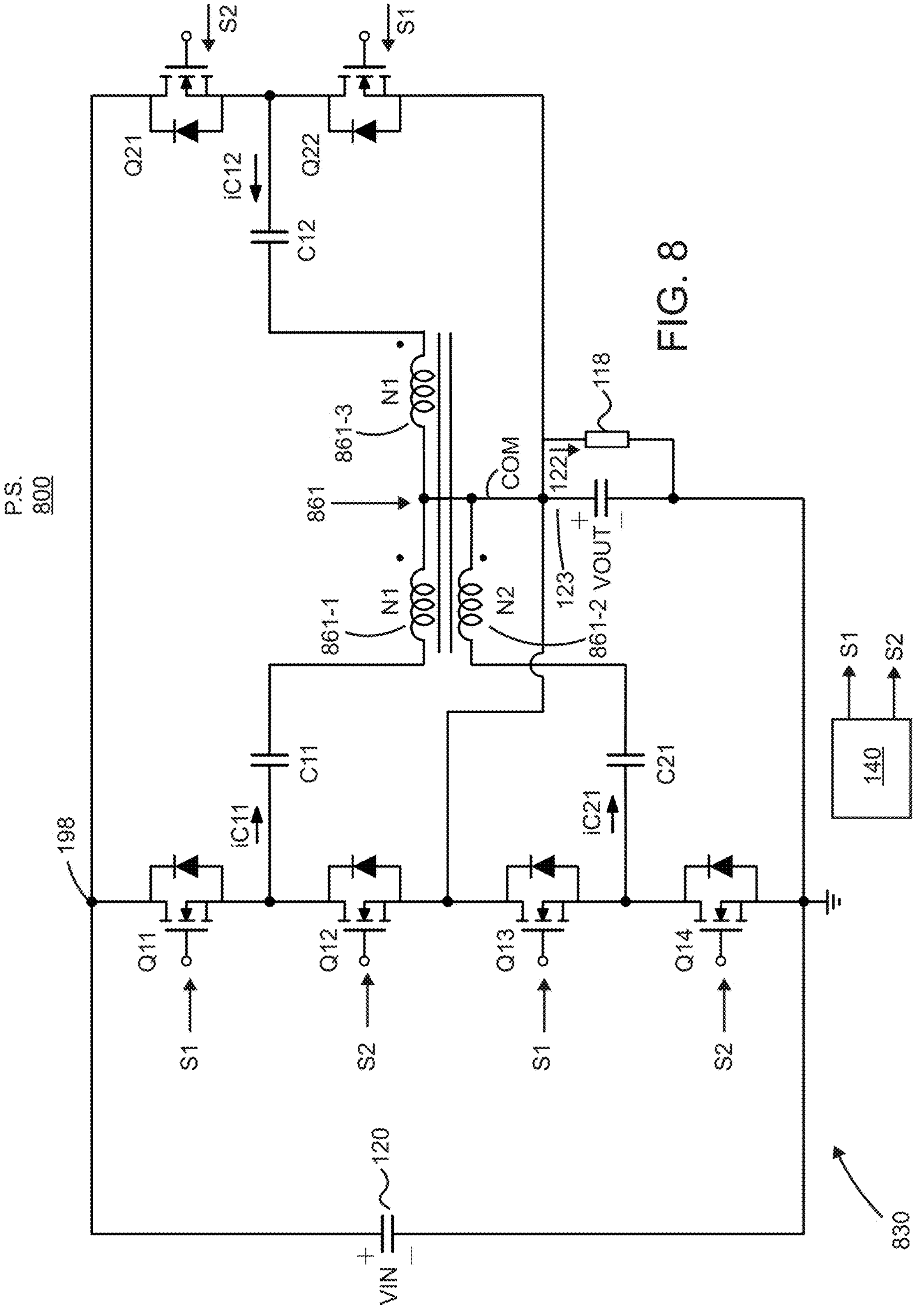
FIG. 8 is an example diagram illustrating a hybrid switched capacitor power converter as discussed herein.

FIG. 8 is an example diagram illustrating a hybrid switched capacitor power converter as discussed herein.

In certain instances, application of the power supply 800 as discussed herein may be required to provide reduced input current ripple associated with input current provided by the voltage source 120. In such an instance, an additional input half-bridge (such as capacitor C12, switch Q21, switch Q22) on the generalized topology as shown in FIG. 1 can be implemented to produce the power supply 800 as shown in FIG. 8.

Figure 9:
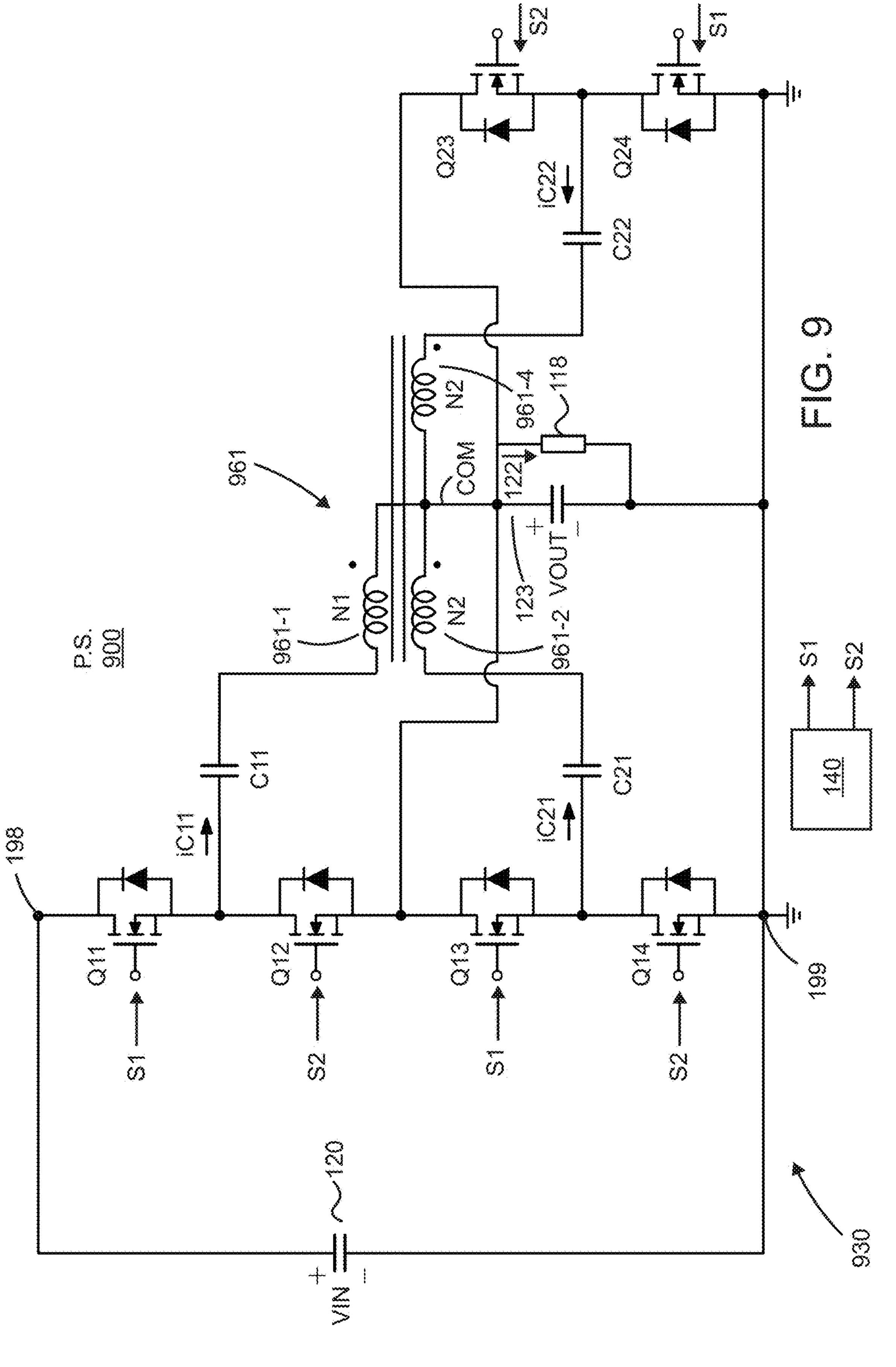
FIG. 9 is an example diagram illustrating a hybrid switched capacitor power converter as discussed herein.

FIG. 9 is an example diagram illustrating a hybrid switched capacitor power converter as discussed herein.

In yet further examples, application of the power supply 930 as discussed herein may include an additional input half-bridge (such as capacitor C22, switch Q23, switch Q24) on the generalized topology as shown in FIG. 1.

Figure 10:
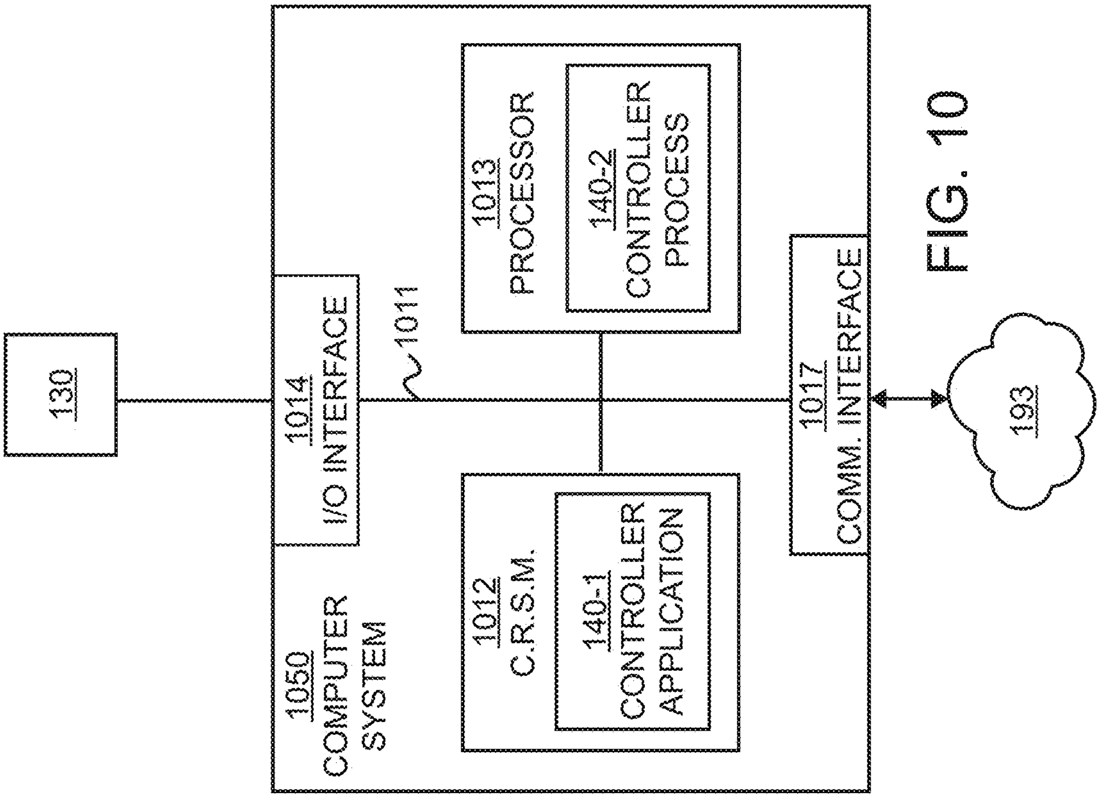
FIG. 10 is an example diagram illustrating implementation of a controller via computer processing hardware as discussed herein.

FIG. 10 is an example block diagram of a computer device for implementing any of the operations as discussed herein according to embodiments herein.

As shown, computer system 1050 (such as implemented by any of one or more resources such as controller 140, etc.) of the present example includes an interconnect 1011 that couples computer readable storage media 1012 such as a non-transitory type of media (or hardware storage media) in which digital information can be stored and retrieved, a processor 1013 (e.g., computer processor hardware such as one or more processor devices), I/O interface 1014, and a communications interface 1017.

I/O interface 1014 provides connectivity to any suitable circuitry such as one or more voltage converters (such as one or more of power converter 130, power converter 730, power converter 830, power converter 930, etc.).

Computer readable storage medium 1012 can be any hardware storage resource or device such as memory, optical storage, hard drive, floppy disk, etc. In one example, the computer readable storage medium 1012 stores instructions and/or data used by the controller application 140-1 to perform any of the operations as described herein.

Further in this example, communications interface 1017 enables the computer system 1050 and processor 1013 to communicate over a resource such as network 190 to retrieve information from remote sources and communicate with other computers.

As shown, computer readable storage media 1012 is encoded with controller 140-1 (e.g., software, firmware, etc.) executed by processor 1013. Controller application 140-1 can be configured to include instructions to implement any of the operations as discussed herein.

During operation in one example, processor 1013 accesses computer readable storage media 1012 via the use of interconnect 1011 in order to launch, run, execute, interpret or otherwise perform the instructions in controller application 140-1 stored on computer readable storage medium 1012.

Execution of the controller application 140-1 produces processing functionality such as controller process 140-2 in processor 1013. In other words, the controller process 140-2 associated with processor 1013 represents one or more aspects of executing controller application 140-1 within or upon the processor 1013 in the computer system 1050 (such as controller 140).

In accordance with different examples, note that computer system 1050 can be a micro-controller device, logic, hardware processor, hybrid analog/digital circuitry, etc., configured to control a power supply and perform any of the operations as described herein.

Functionality supported by the different resources will now be discussed via flowchart in FIG. 11. Note that the steps in the flowcharts below can be executed in any suitable order.

Figure 11:
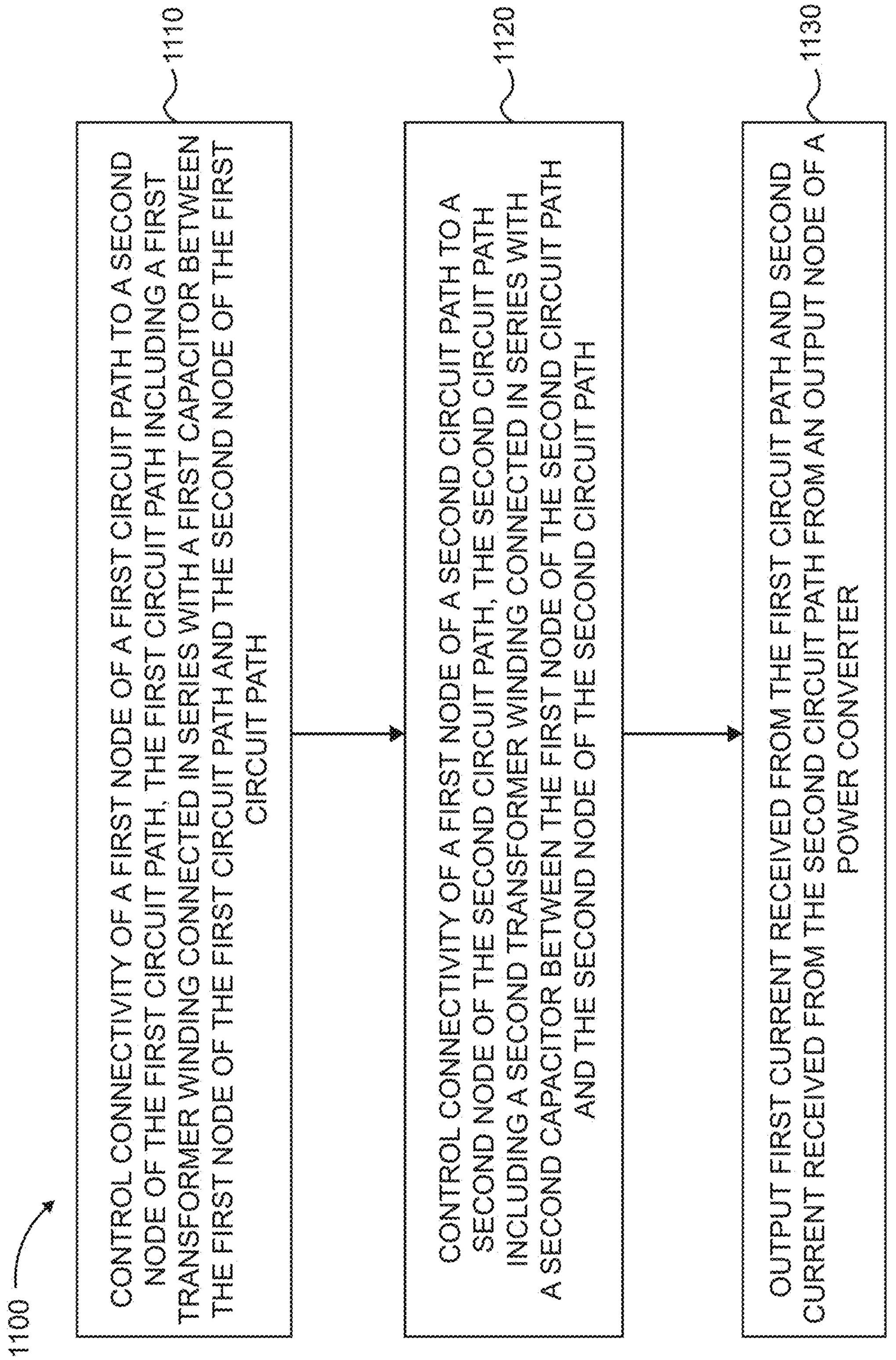
FIG. 11 is an example diagram illustrating a general method of operating a power converter as described herein.

FIG. 11 is a flowchart 1100 illustrating an example method of operating a power converter as discussed herein. Note that there will be some overlap with respect to concepts as discussed above.

In processing operation 1110, the controller 140 controls connectivity of a first node N11 of a first circuit path 131 to a second node N12 of the first circuit path 131. The first circuit path 131 includes a first transformer winding 161-1 connected in series with a first capacitor C1 between the first node N11 of the first circuit path 131 and the second node N12 of the first circuit path 131.

In processing operation 1120, the controller 140 controls connectivity of a first node N21 of a second circuit path 132 to a second node N22 of the second circuit path 132. The second circuit path 132 includes a second transformer winding 161-2 connected in series with a second capacitor C2 between the first node N21 of the second circuit path 132 and the second node N22 of the second circuit path 132.

In processing operation 1130, the power converter 130 outputs first current iC1 received from the first circuit path 131 and second current-iC2 received from the second circuit path 132 from an output node N13 of the power converter 130 to produce the output voltage 123 and corresponding output current 122.

Note again that techniques herein are well suited for use in power supply applications. However, it should be noted that the disclosure of matter herein is not limited to use in such applications and that the techniques discussed herein are well suited for other applications as well.

While this invention has been particularly shown and described with references to preferred aspects thereof, it will be understood by those skilled in the art that various changes in form and details may be made therein without departing from the spirit and scope of the present application as defined by the appended claims. Such variations are intended to be covered by the scope of this present application. As such, the foregoing description in the present disclosure is not intended to be limiting. Rather, any limitations to the invention are presented in the following claims.

The invention claimed is:

1. A power converter comprising:

a first circuit path including a first transformer winding connected in series with a first capacitor between a first node of the first circuit path and a second node of the first circuit path, the second node of the first circuit path connected to an output node of the power converter;

a second circuit path including a second transformer winding connected in series with a second capacitor between a first node of the second circuit path and a second node of the second circuit path, the second node of the second circuit path connected to the output node of the power converter;

first switch circuitry operative to control direct connectivity of the first node of the first circuit path to the second node of the first circuit path; and second switch circuitry operative to control direct connectivity of the first node of the second circuit path to the second node of the second circuit path.

2. The power converter as in claim 1 further comprising:

a controller operative to control the first switch circuitry and the second switch circuitry in accordance with a first mode and a second mode, the first mode including activation of the second switch circuitry to an ON-state and deactivation of the first switch circuitry to an OFF-state, the second mode including activation of the first switch circuitry to an ON-state and deactivation of the second switch circuitry to an OFF-state.

3. The power converter as in claim 2, wherein a magnitude of an output current outputted from the output node of the power converter is substantially equal to a magnitude of first current through the first circuit path during the first mode; and wherein the magnitude of the output current outputted from the output node of the power converter is substantially equal to a magnitude of second current through the second circuit path during the second mode.

4. The power converter as in claim 1 further comprising:

third switch circuitry disposed in series with the first switch circuitry between an input voltage source and the output node, the third switch circuitry directly coupled between the input voltage source and the first node of the first circuit path; and fourth switch circuitry disposed in series with the second switch circuitry between the output node and a reference voltage, the fourth switch circuitry directly coupled between the first node of the second circuit path and a reference voltage node.

5. The power converter as in claim 4 further comprising:

a controller operative to control the first switch circuitry, the second switch circuitry, the third switch circuitry, and the fourth switch circuitry in accordance with a first mode and a second mode;

wherein the first mode includes activation of the third switch circuitry and the second switch circuitry to ON-states and deactivation of the fourth switch circuitry and the first switch circuitry to OFF-states; and wherein the second mode includes deactivation of the third switch circuitry and the second switch circuitry to OFF-states and activation of the fourth switch circuitry and the first switch circuitry to ON-states.

6. The power converter as in claim 5, wherein operation in the first mode charges the first capacitor and discharges the second capacitor; and wherein operation in the second mode discharges the first capacitor and charges the second capacitor.

7. The power converter as in claim 1 further comprising:

a series connection of multiple switches between an input voltage source and a reference voltage node, the series connection including the first switch circuitry and the second switch circuitry.

8. The power converter as in claim 1, wherein the first switch circuitry and the second switch circuitry are activated in accordance with zero voltage switching.

9. The power converter as in claim 1 further comprising:

an autotransformer including the first transformer winding and the second transformer winding disposed in series.

10. The power converter as in claim 1, wherein switching operation of the first switch circuitry and the second switch circuitry is configured to provide full bridge rectification of first current through the first capacitor and second current through the second capacitor to produce a corresponding output current outputted from the output node.

11. The power converter as in claim 1, wherein a first node of the first switch circuitry is directly connected to the first node of the first circuit path; and wherein a second node of the first switch circuitry is directly connected to the second node of the first circuit path.

12. The power converter as in claim 11, wherein the first node of the first switch circuitry is a drain node of the first switch circuitry; and wherein the second node of the first switch circuitry is a source node of in the first switch circuitry.

13. The power converter as in claim 12, wherein a first node of the second switch circuitry is directly connected to the first node of the second circuit path;

wherein a second node of the second switch circuitry is directly connected to the second node of the second circuit path;

wherein the first node of the second switch circuitry is a source node of the second switch circuitry; and wherein the second node of the second switch circuitry is a drain node of the second switch circuitry.

14. The power converter as in claim 1, wherein the first transformer winding is magnetically coupled to the second transformer winding in a first transformer.

15. The power converter as in claim 14, wherein the first transformer winding is directly connected to the second transformer winding via a center tap node of the first transformer;

wherein both the second node of the first circuit path and the second node of the second circuit path are directly connected to the output node of the power converter; and wherein the output node of the power converter is directly connected to the center tap node of the first transformer.

16. The power converter as in claim 1, wherein a first combination of the first switch circuitry, the first capacitor, and the first transformer winding are disposed in a first circuit loop; and wherein a second combination of the second switch circuitry, the second capacitor, and the second transformer winding are disposed in a second circuit loop.

17. The power converter as in claim 1, wherein the first switch circuitry is directly connected to the first capacitor;

wherein the first capacitor is directly connected to the first transformer winding;

wherein the first transformer winding is directly connected to the first switch circuitry;

wherein the second switch circuitry is directly connected to the second capacitor;

wherein the second capacitor is directly connected to the second transformer winding; and wherein the second transformer winding is directly connected to the second switch circuitry.

18. The power converter as in claim 17, wherein the second transformer winding is magnetically coupled to the first transformer winding.

19. A method comprising:

via first switch circuitry, controlling direct connectivity of a first node of a first circuit path to a second node of the first circuit path, the first circuit path including a first transformer winding connected in series with a first capacitor between the first node of the first circuit path and the second node of the first circuit path;

via second switch circuitry, controlling direct connectivity of a first node of a second circuit path to a second node of the second circuit path, the second circuit path including a second transformer winding connected in series with a second capacitor between the first node of the second circuit path and the second node of the second circuit path; and outputting first current received from the first circuit path and second current received from the second circuit path from an output node of a power converter.

20. The method as in claim 19 further comprising:

controlling the first switch circuitry and the second switch circuitry in accordance with a first mode and a second mode, the first mode including activation of the second switch circuitry to an ON-state and deactivation of the first switch circuitry to an OFF-state, the second mode including activation of the first switch circuitry to an ON-state and deactivation of the second switch circuitry to an OFF-state.

21. The method as in claim 20, wherein a magnitude of an output current outputted from the output node of the power converter is substantially equal to a magnitude of first current through the first circuit path during the first mode; and wherein the magnitude of the output current outputted from the output node of the power converter is substantially equal to a magnitude of second current through the second circuit path during the second mode.

22. The method as in claim 19 further comprising:

controlling operation of third switch circuitry disposed in series with the first switch circuitry between an input voltage source and the output node, the third switch circuitry directly coupled between the input voltage source and the first node of the first circuit path; and controlling operation of fourth switch circuitry disposed in series with the second switch circuitry between the output node and a reference voltage, the fourth switch circuitry directly coupled between the first node of the second circuit path and a reference voltage node.

23. The method as in claim 22 further comprising:

controlling the first switch circuitry, the second switch circuitry, the third switch circuitry, and the fourth switch circuitry in accordance with a first mode and a second mode;

in the first mode, activating the third switch circuitry and the second switch circuitry to ON-states and deactivating the fourth switch circuitry and the first switch circuitry to OFF-states; and in the second mode, deactivating the third switch circuitry and the second switch circuitry to OFF-states and activating the fourth switch circuitry and the first switch circuitry to ON-states.

24. The method as in claim 23, wherein operation in the first mode charges the first capacitor and discharges the second capacitor; and wherein operation in the second mode discharges the first capacitor and charges the second capacitor.

25. The method as in claim 19 further comprising:

via switching operation of the first switch circuitry and the second switch circuitry, providing full bridge rectification of first current through the first capacitor and second current through the second capacitor to produce a corresponding output current outputted from the output node.

* * * * *